Nov. 25, 1969  P. F. FREEMAN  3,479,950
BALER FOR COTTON MOTES AND OTHER MATERIALS
Filed Dec. 18, 1967  5 Sheets-Sheet 5
FIG. 10
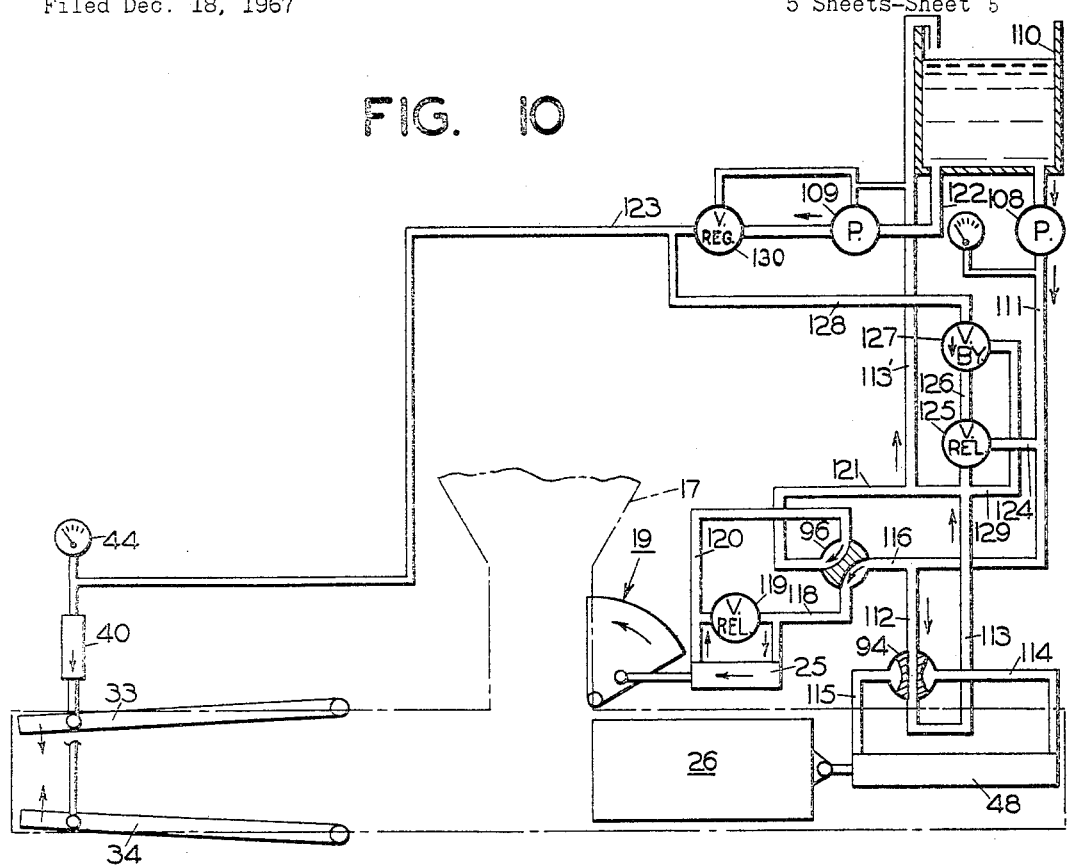
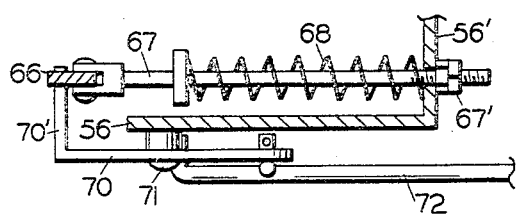
FIG. 9
INVENTOR.
PERCY F. FREEMAN
BY
*T. R. Geisler*
ATTORNEY

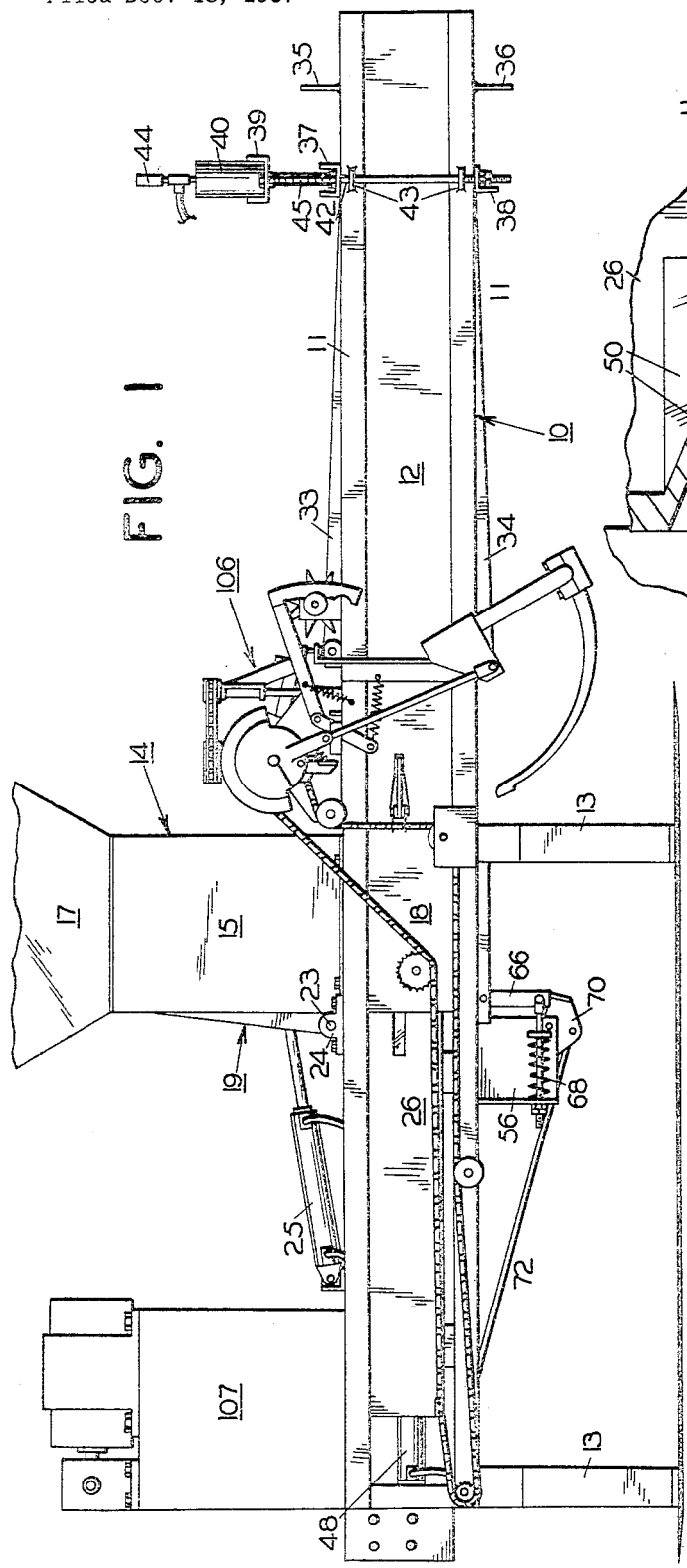
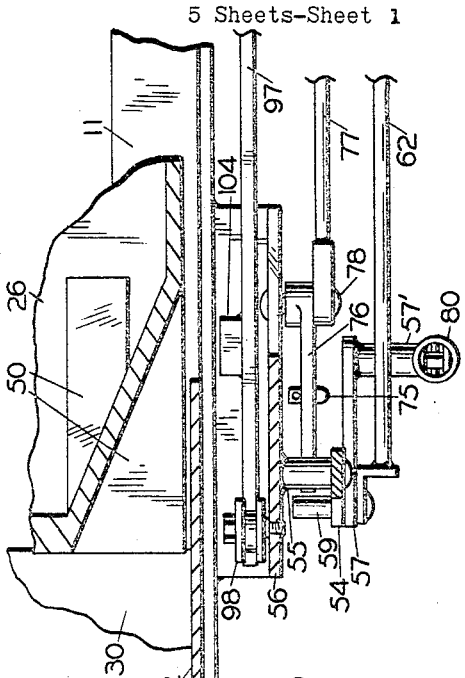

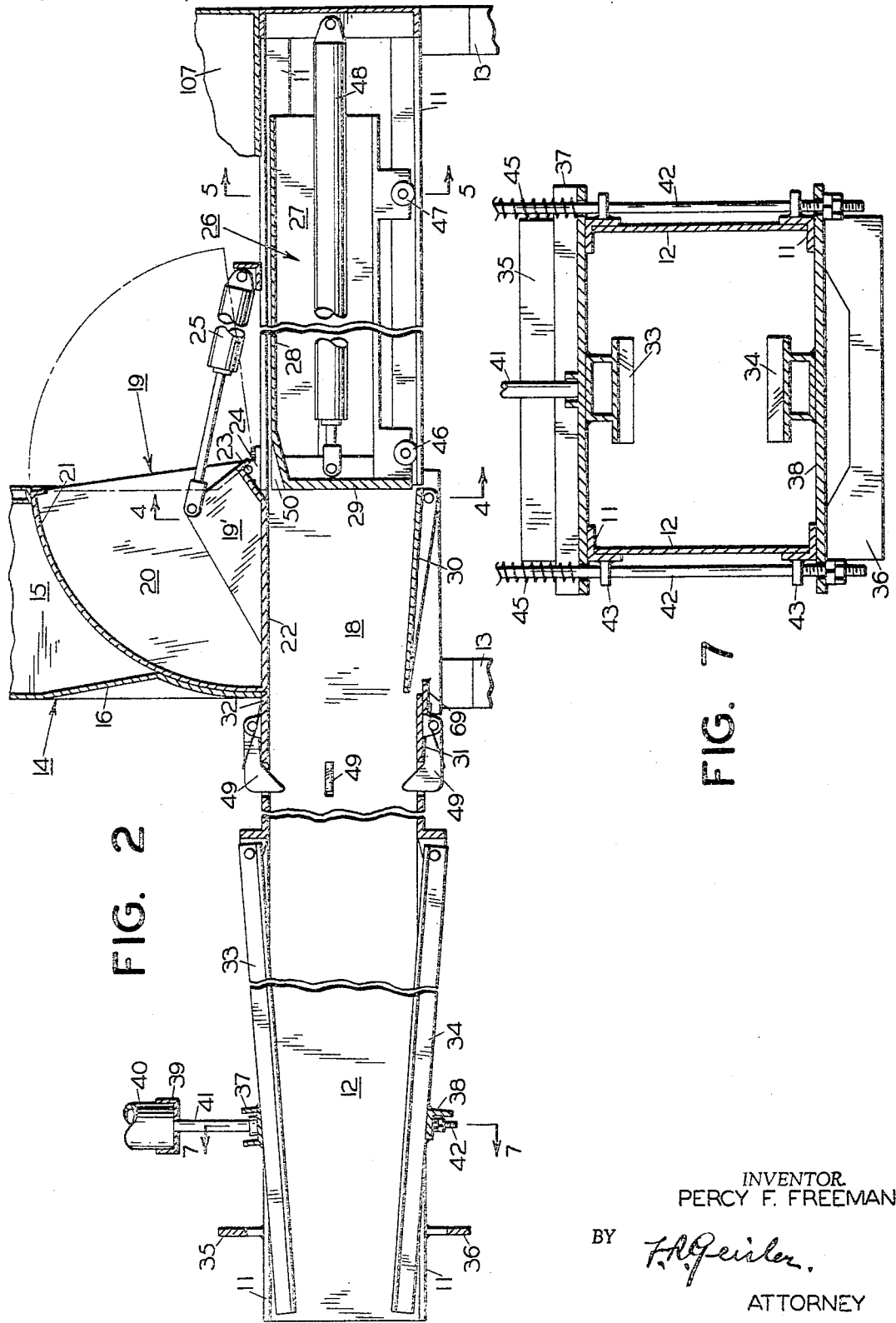

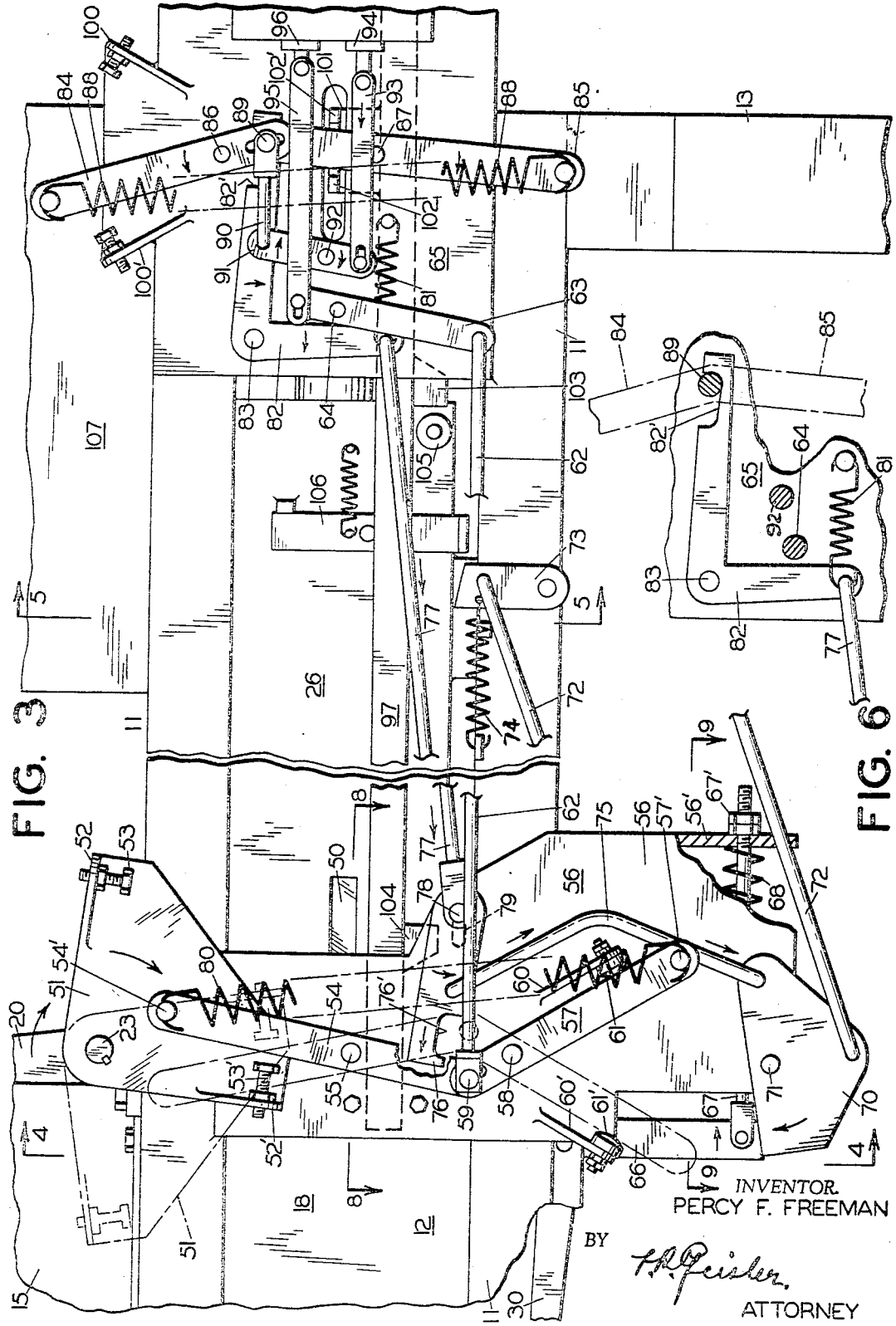

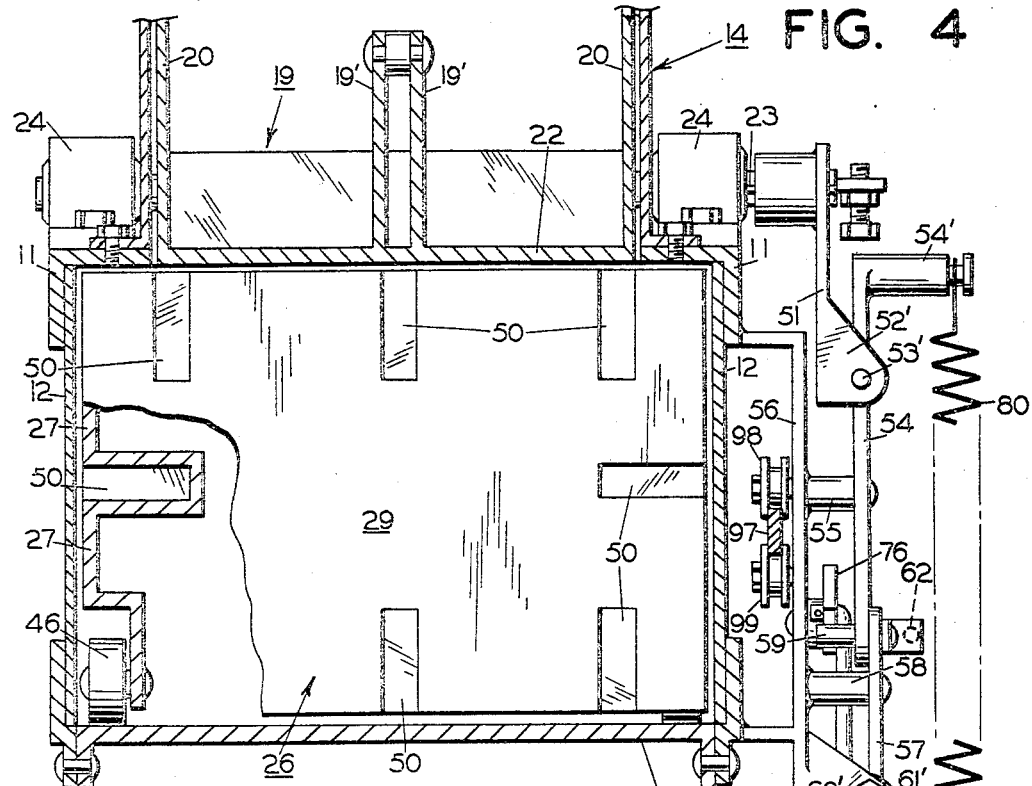

United States Patent Office 3,479,950
Patented Nov. 25, 1969

3,479,950
BALER FOR COTTON MOTES AND OTHER
MATERIALS
Percy F. Freeman, 4061 SW. Greenleaf Drive,
Portland, Oreg. 97221
Filed Dec. 18, 1967, Ser. No. 691,347
Int. Cl. B30b 15/26, 15/16
U.S. Cl. 100—49                                   4 Claims

ABSTRACT OF THE DISCLOSURE

An automatically operating baler in which the accumulation of a desired mass of material in the baling chamber by the delivery packer causes the operation of the latter temporarily to cease and the plunger to operate to compress the material and force it into the baler discharge channel against a previously formed bale, the restraining tension imposed on the previously formed bale in the discharge channel being automatically governed by the load on the plunger so as to prevent overload on the plunger.

BACKGROUND OF THE INVENTION

In general the invention relates to baling machines, such as the well-known hay balers in which the hay or other material to be baled is delivered by mechanical means into a baling or compressing chamber and there acted upon by a reciprocating compressing plunger, the plunger forcing the compressed material into the discharge channel of the machine while automatic bale tying mechanism operates to tie the material into bale form each time sufficient material for one bale has moved a predetermined distance in the discharge channel, each new bale being formed pushing the previously formed bale on through the discharge channel.

However, the present invention is concerned with the baling of material of a character different from hay and straw, and is concerned particularly with cotton motes which are more conveniently and in a more practical manner fed partly by gravity down into the packer chamber from the top. In the baling of cotton motes the material in the packer chamber is not acted upon by the plunger until the packer chamber has been filled with a predetermined mass of the material, whereupon a single thrust of the plunger compresses the mass into a bale, with the customary bale tying taking place. During the compression by the plunger the bale being formed is thrust against the previous bale which, as usual, has been restrained in the discharge channel of the baler, and the resistance offered by the previous bale to being thrust along through the discharge channel cooperates with the plunger in the compressing of the material to bale size.

To insure sufficient compression while a bale of cotton motes is being formed in such a baler, it has become customary to provide restraining tension for the previous bale or bales being held in the discharge channel of the baler. One way in which this is accomplished is by the use of longitudinally-extending tension rails, pivotally mounted at their inner ends, extending along opposite sides of the restrained bale and engaged by means near their outer ends which urge them against the bale and seek to decrease the size of the channel through which the bale is forced to pass.

If the density of the material forming the bales were constantly the same the setting up of a predetermined amount of restraining tension for the bales as they are thrust through the discharge channel of the baler would probably work out satisfactorily, but in the baling of cotton motes, for example, this is not the case, for if the motes are wet when baled the density of the resulting bale will be considerably greater than when the baling material is in its customary dry state. Since cotton motes are baled in the wet as well as the dry state, the continuous operation of balers for cotton motes, which motes part of the time may be in the wet state instead of in the more customary dry state, has caused considerable difficuly.

Thus when the restraining tension on the formed bales has been set in the baler for bales formed of cotton motes in the dry state, the delivery of cotton motes in a wet state into the baler, resulting in bales of greater density, will, unless the restraining tension on the formed bales is adjusted and reduced, impose a considerably increased load on the plunger. Such increased load on the plunger under such conditions has been found to be so great at times as to cause damage to the machinery and/or to stop the machine. In order to avoid such danger it has been necessary for an operator to exercise careful watch of the material being delivered to the baler and to stop the baler and adjust and test the restraining tension when motes in a wet state are being delivered to a baler on which the efficient restraining tension has previously been set for the baling of the material in the dry state. Such servicing involves delay and extra expense in the operation of what would otherwise be a completely automatic baling machine, and the object of the present invention is to avoid this problem.

SUMMARY OF THE INVENTION

In the improved baler of the present invention, which, as previously indicated, has been developed particularly for cotton motes, but which may also be used efficiently for other materials (such, for example, as shredded paper), the material to be baled drops down from a hopper and is discharged into the baling or compression chamber through a top entrance by means known as a packer. The packer swings downwardly and upwardly through an arc of approximately 90° and operates continuously until the desired amount of material has been received into the baling chamber.

The bottom of the baling chamber has a spring-controlled trip plate, and when the baling chamber has been sufficiently filled with material to be baled to form a bale, the downward pressure on the trip plate causes the packer temporarily to stop and to remain in down position closing the top of the baling chamber, and also causes the plunger or ram to start its compression stroke.

The plunger, which is operated by hydraulic means, compresses the material in the baling chamber by thrusting the material against a previously formed bale, the previously formed bale being temporarily held in the discharge channel of the baler by restraining tension in the manner previously indicated. The restraining tension for the previously formed bale in the device of the present invention is also exerted by hydraulic means, which, however, is automatically controlled by the hydraulic pressure required for moving the plunger during its compression stroke. The arrangement is such that any undesired substantial increase in the hydraulic pressure required for operating the plunger will automatically immediately temporarily cause the hydraulic pressure operating the bale-restraining tension means to be reduced. The easing of the latter reduces the amount of load imposed on the plunger. In this way any overload on the plunger is automatically avoided and the necessity of stopping the machine and making adjustments to enable the baler, when properly set up for baling motes in the dry state, to continue the automatic baling operation as a supply of motes in a wet state is delivered to the baler, is no longer necessary.

BRIEF DESCRIPTION OF THE DRAWINGS

In the drawings:

FIG. 1 (Sheet 1) is a side elevation of the baler;

FIG. 2 (Sheet 2) is a foreshortened sectional elevation taken from the side opposite that shown in FIG. 1, and drawn to slightly larger scale, with certain parts, including the bale tying mechanism, omitted for clarity;

FIG. 3 (Sheet 3) is a fragmentary foreshortened elevation of a portion of the baler taken from the side opposite that shown in FIG. 1;

FIG. 4 (Sheet 4) is a fragmentary cross sectional elevation taken on lines 4—4 of FIG. 3 and FIG. 2, drawn to a larger scale;

FIG. 5 (Sheet 4) is a fragmentary cross sectional elevation taken on line 5—5 of FIG. 3 and 5—5 of FIG. 2, drawn to the same scale as FIG. 4;

FIG. 6 (Sheet 3) is a fragmentary sectional elevation similar in part to FIG. 3 showing in detail in one of the elements of the mechanism in FIG. 3;

FIG. 7 (Sheeet 2) is a cross sectional elevation on the line indicated at 7—7 of FIG. 2;

FIG. 8 (Sheet 1) is a fragmentary section taken on the line 8—8 of FIG. 3, drawn to a larger scale;

FIG. 9 (Sheet 5) is a fragmentary section on line 9—9 of FIG. 3; and

FIG. 10 (Sheet 5) is a diagram illustrating the hydraulic circuits which operate portions of the baler.

Referring first to FIG. 1, the baler includes a horizontally-extending rectangular main frame 10 including four angle iron members 11 which form longitudinal edge members for the main frame, a pair of side plates 12, one of which is shown in FIG. 1, and various top and bottom cross members, some of which are referred to later, which combine in forming a rigid frame of rectangular cross section. The frame is supported on suitable standards, two of which are shown in 13 of FIG. 1.

A packer chute 14, consisting of a pair of side plates 15 and an end wall 16 (shaped as shown in FIG. 2), is mounted on the main frame in the location indicated in FIG. 1 and leads down from a hopper 17 into the baling chamber 18. The delivery of material down through the packer chute into the baling chamber 18 is controlled by a packer 19 which swings up and down through an arc of approximately 90°.

The packer 19, shown best in FIG. 2, comprises a pair of identical parallel side walls 20 in the shape approximately of a quarter of a circle, one of which is shown in FIG. 2, a curved top wall 21, and a bottom wall 22 which is flat except at the end opposite the top wall where it is turned up at an angle to extend over the hinge shaft on which the packer is mounted. The width of the packer is approximately the same as the inside width of the packer chute 14, and the curved top wall 21 of the packer, when the packer is in the lower closed position, has a slight clearance with the lower portion of the specially shaped end wall 16 of the chute, as shown in FIG. 2. Thus the packer, in lower position, closes off the chute 14 and the bottom wall 22 of the packer then acts as the top closure for the baling chamber 18. In FIG. 2 the packer is shown in full lines in lowered closed position and its raised or open position is indicated by broken lines. The packer is mounted on a hinge shaft 23 which in turn is supported in a pair of bearing mounts 24 secured to the top of the baler main frame in opposite sides respectively.

A pair of brackets 19' (FIGS. 2 and 4) centrally positioned in the packer 19, support a across pin to which the end of the piston rod of the hydraulic cylinder and piston assembly 25 is connected, the packer being alternately raised and lowered by operation of the hydraulic cylinder and piston assembly 25. The hydraulic cylinder has a pivotal mounting on a member extending across the top of the main frame is shown in FIG. 2.

The side plates 12 of the main frame 10 of the baler extend rearwardly from the discharging end of the baler (the discharging end being at the right as viewed in FIG. 1 and at the left as viewed in FIG. 2), and the side plates 12 extend to the rear end of the baling chamber 18. A ram or plunger 26, having a pair of side walls 27, a top wall 28, and a front wall 29 is so located that when it is in retracted or inactive position the front wall 29 forms the back wall of the baling chamber 18, as shown in FIG. 2. A spring-controlled trip plate 30 (FIG. 2) constitutes the bottom of the baling chamber 18 in conjunction with a stationary bottom wall section 31 at the forward end of the chamber. When the packer 19 is in the lowered or closed position, as previously mentioned and shown in full lines in FIG. 2, the bottom wall 22 of the packer forms the top wall of the baling chamber together with a stationary top wall section 32 at the forward end of the baling chamber.

The discharging channel of the baler, which extends forwardly from the baling chamber, comprises, in addition to the stationary side plates 12 and the angle iron corner members 11, a pair of top and bottom longitudinally-extending tension rails 33 and 34 (FIGS. 2 and 7) which are hinged at their inner ends to the stationary top and bottom wall portions 32 and 31 of the baling chamber respectively. A bridging tie element 35, having its ends secured to the two angle iron top corner members 11 respectively, and a similar tie element 36 having its ends secured to the two angle iron bottom corner members 11 respectively, hold the sides of the discharging channel firmly in spaced parallel position. The longitudinally-extending tension rails 33 and 34 are positioned approximately midway between the top corner members 11 and bottom corner members respectively.

Intermediate their ends the top and bottom tension rails 33 and 34 are attached to the mid portions of the pair of transverse members 37 and 38 respectively (FIG. 7) which extend out beyond the sides of the discharging channel. The ends of these members are provided with apertures through which a pair of tension bolts 42 extend. These tension bolts pass down through guides 43 in the corner members 11. A transversely-extending cylinder-supporting frame 39 is secured at each end to the tops of the tension bolts 43 respectively. A spring 45, which is under slight tension at all times, is mounted on each of the tension bolts 42 between the cylinder-supporting frame 39 and the transverse member 37.

A hydraulic cylinder 40 is secured on the cylinder-supporting frame 39. The piston rod 41 from the piston in the hydraulic cylinder 40 extends downwardly through an opening in the cylinder-supporting frame 39 and engages the transverse member 37. As apparent from FIGS. 1, 2 and 7, the hydraulic pressure in the cylinder 40 governs the force causing the tensioning rails 33 and 34 to be urged downwardly and upwardly respectively against the bale in the discharging channel of the baler. A gage 44 is connected with the cylinder 40 to indicate the hydraulic pressure.

The ram or plunger 26 (FIG. 2) is mounted on a pair of forward wheels 46 and a pair of rear wheels 47, one of the wheels in each pair being shown in FIG. 2, with the wheels of each pair riding on the bottom pair of longitudinally-extending angle iron corner members 11 respectively. The plunger is operated by a hydraulic cylinder and piston assembly 48, mounted as indicated in FIG. 2, and thus, upon the forward stroke of the piston and piston rod in this hydraulic assembly, the plunger is moved to the left, as viewed in FIG. 2, from the retracted position shown in the figure, moving forwardly through the baling chamber 18 and performing the compressing operation on the material which has been deposited in the baling chamber.

A plurality of spring-actuated dogs 49 (FIG. 2) are mounted on the walls of the baling chamber at the outlet end and normally extend through apertures in the walls a short distance into the chamber, acting under the force of their spring elements. The purpose of these dogs is to prevent any slight backward travel of a compressed bale after it has been thrust from the baling chamber into the intake end of the discharging channel by the operation of the plunger. As the plunger completes its compressing forward stroke the forward end of the plunger moves slightly beyond these dogs before the plunger starts its return stroke. The forward end of the plunger is provided with inclined grooves 50 (see FIG. 4) so arranged as to engage these dogs and push them temporarily outwardly against the force of their springs when the plunger reaches its extreme forward position.

As previously mentioned, the packer, the plunger, and the tension rails in the discharging channel of the baler are all operated by hydraulic means. Connected control circuits and actuating mechanism, to be presently described, are so arranged as to control and coordinate the various operations of the separate hydraulic assemblies in such manner that the various operations of the baler are performed automatically, in proper sequence, and under proper control.

A toggle-operating quadrant 51 (FIGS. 3 and 4) is keyed to the hinge shaft 23 of the packer 19 and is so arranged that when the packer is in the down position (as shown in full lines in FIG. 2) the quadrant 51 will be positioned as shown in FIG. 3 in full lines, and consequently, when the packer is in raised position, the quadrant will be position as shown by the broken line in FIG. 3. The quadrant is provided with a pair of flanges 52 and 52' at its opposite edges respectively. A pair of lever-engaging screws 53, 53' are mounted in the flanges 52, 52' respectively.

An upper toggle lever 54 (FIGS. 3 and 4) is pivotally mounted on a stub shaft 55 carried on a support plate 56 secured on the side of the main frame of the baler. The bottom end of this upper toggle lever 54 is pivotally connected to the top end of a lower toggle lever 57 which is pivotally mounted on stub shaft 58 carried on the support plate 56. The pivot pin 59 by which the upper and lower toggle levers 54 and 57 are connected extends through a short longitudinal slot in the toggle lever 57 so as to enable the connected toggle levers to have limited rotation on their fixed mounting shafts.

A snap-over toggle spring 80, always in tension, has its upper end attached to a mount 54' at the upper end of the upper toggle level 54 and its bottom end attached to a similar mount 57' on the bottom end of the lower toggle lever 57. The support plate 56 is formed with a pair of integral brackets 60 and 60' which carry limit screws 61 and 61' respectively, and these limit screws limit the swing of the lower toggle lever 57, and therewith the swing of the upper toggle lever 54. The pivot pin 59, through which the upper and lower toggle levers 54 and 57 are connected, also carries the end of a valve-operating rod 62, later referred to. Thus, as will now be apparent from FIG. 3, the up and down movement of the packer 19, previously mentioned, causing the toggle-operating quadrant 51 (FIG. 3) to move from the full line position to and from the broken line position, as shown in FIG. 3, will cause the toggle levers 54 and 57, under the pull of their spring 80, to move from the full line position to and from the broken line position, as shown in FIG. 3, and their movement will cause reciprocation of the rod 62.

The rod 62 is connected to a lever 63 (FIG. 3), pivotally supported on a stub shaft 64 carried on a support plate 65 secured on the side of the main frame of the machine. The lever 63 is connected to a valve link 95 which operates a reversing control valve 96, later referred to, in the hydraulic line leading to the hydraulic cylinder assembly 25 (FIG. 2) which operates the packer 19. Thus, when the hydraulic pump for the hydraulic cylinder and piston assembly 25 is in operation, the packer 19 will move alternately up and down as long as the toggle levers 54 and 57 and the rod 62 are free to move.

The hinged trip plate 30 (FIGS. 2, 3, 4,) has an integral, downwardly-extending arm 66 on one side. A spring-carrying rod 67 (FIGS. 3 and 9) has one end pivotally connected to the arm 66. The other end of this rod 67, which is screw-threaded, extends through an aperture in the side flange 56' on the support plate 56 and carries a nut 67'. A coil spring 68, carried on the rod 67, is held under compression between the flange 56' and the arm 67, and normally holds the trip plate 30 in the raised position shown in FIG. 2, but enables the trip plate to be thrust downwardly against the force of spring 68 and against a stop 69 (FIG. 2) when the downward pressure of the material in the baling chamber 18, compacted by the packer 19 is sufficient to overcome the force of the spring 68.

The bottom end of the arm 66 (FIGS. 3, 4, and 9), when the trip plate 30 is in normal raised position, acts as a catch for a control plate 70 which is pivotally mounted at 71 (FIG. 3) at the bottom of the support plate 56. The plate 70 has an inwardly-extending lip 70' on its front end which is engaged by the bottom end of the arm 66 when the trip plate is in upper position, but when the trip plate is pushed down to lower position the bottom end of the arm 66 is moved out of engagement with the lip 70' which enables the control plate to swing further (in clockwise direction). A link rod 72 connects the plate 70 with an arm 73 which is pivotally mounted on the side of the main frame of the baler in the location shown in FIG. 3. The arm 73 is attached to an end of a spring 74, the other end of the spring being attached to the main frame, and the spring 74 is under tension at all times and exerts a constant force tending to move the plate 70 in clockwise direction as viewed in FIG. 3.

A second link rod 75, having its lower end also attached to the plate 70 (FIG. 3), has its upper end pivotally connected to a toggle latch member 76. This toggle latch member 76 is pivotally connected to a link rod 77 by a pivot pin 78, which pivot pin extends through a short horizontal slot 79 in the side of the support plate 56. The toggle latch member 76 is formed with a notch 76' which, when the latch member 76 is lowered, engages the pin 59 by which the upper and lower toggle levers 54 and 57 are connected.

When the notch 76' on the latch member 76 engages the toggle lever pin 59 the movement of the toggle levers to the full line positions shown in FIG. 3 (when the packer 19 moves down to lowered position), causes the link rod 77 to be pulled a short distance (to the left as viewed in FIG. 3) against the force of its spring 81, and causes a bell crank lever 82, to which the rod 77 is connected, and which is pivotally mounted at 83 on the support plate 65, to be given a slight rotation (clockwise as viewed in FIG. 3). The engagement of the latch member 76 with the toggle lever pin 59 temporarily holds the packer 19 in the lowered position and prevents further movement of the packer. The simultaneous pull (to the left) on the link rod 77 by the latch member 76 also starts the movement of the plunger 26 into the baling chamber, as presently to be explained.

A second pair of toggle levers, thus an upper toggle lever 84 and a lower toggle lever 85 (FIGS. 3, 5, and 6), are mounted on the pivot shafts 86 and 87 respectively carried on the support plate 65. A snap-over toggle spring 88 has its upper and lower ends attached to the upper and lower ends of the upper and lower toggle levers 84 and 85 respectively. The toggle levers 84 and 85 are connected together by a pivot pin 89, secured on the toggle lever 85 and extending through a short slot in the toggle lever 84. The support plate 65 (FIG. 3) has a pair of opposite flanges 100 and 100' which carry limit screws limiting the maximum movement of the upper and lower toggle levers 84 and 85.

The pivot pin 89, connecting the upper and lower toggle levers 84 and 85, also supports one end of the link 90 connected to the lever arm 91. The lever arm 91, which is pivoted on the shaft 92 mounted on the support plate 65, is connected to a link 93 which operates a control valve 94, referred to later, in the hydraulic line to the hydraulic cylinder and piston assembly 48 (FIG. 2) which operates the plunger 26.

The upper arm of the bell crank lever 82 (FIGS. 3 and 6) is formed with a notch 82' which, when the bell crank lever is in its normal position under the pull of its spring 81, engages the pin 89 by which the upper and lower toggle levers 84 and 85 are connected, and holds these levers in the relative position shown in FIG. 3. When the bell crank lever 82 is moved (clockwise as viewed in FIG. 3) against the force of its spring 81 by the pull on the link rod 77, the lowering of the engaging notch 82 from the pin 89 enables the toggle levers 84, 85 to complete their swing under the force of their spring 88 and move the link 90, lever arm 91 and link 93 in the respective directions indicated by the arrows in FIG. 3 and operate the control valve 94. This results in movement of the plunger 26 (toward the left as viewed in FIG. 3) into the baling chamber.

Thus, when the baling chamber 18 (FIG. 2) has been filled by the packer 19 with the desired amount of material for a bale, the downward pressure on the trip plate 30 moves the trip plate to lowered position against the force of its spring, and the lowering of the trip plate, acting through the related means as previously described, causes the packer 19 temporarily to be held in down position and causes operation of the control valve in the hydraulic circuit for the plunger which results in movement of the plunger into the closed baling chamber.

A horizontal slide bar 97 (FIGS. 3, 4, 5 and 8) is mounted between a pair of guide rollers 98 and 99 (FIG. 4) on the inside of support plate 56, and between a similar pair of guide rollers (not shown) on the inside of support plate 65. An upstanding arm 101 (FIGS. 3 and 5) on the slide bar 97 carries a pair of spaced outwardly-extending fingers 102, 102' which are arranged for engagement with opposite edges of the toggle lever 85 at different times. The slide bar 97 also carries a pair of downwardly-extending, inwardly-offset arms 103 and 104 adapted to be engaged by a member 105 mounted on the side of the plunger 26 when the plunger reaches the extent of its forward and rearward travel respectively.

As the plunger 26 reaches the end of its forward compressing stroke, the member 105 (FIG. 3) on the side of the plunger comes into contact with the forward arm 104 of the slide 97. The resulting movement of the slide 97 (to the left as viewed in FIG. 3) causes the finger 102' on the upstanding arm 101 of the slide 97 to engage the toggle lever 85 and to move it (in counterclockwise direction) until the snap-over toggle spring 88 causes the toggle levers to swing to the extreme position opposite to that shown in FIG. 3, this movement being possible because the notch 82' of the bell crank 82 is still being held out of engaging contact with the pin 89. The resulting movement of the members 90, 91 and 93, reverses the control valve 94 and causes the plunger to move back (to the right) towards its inactive starting position.

During the return movement of the plunger 26 a pivoted arm 106 on the side of the plunger engages the arm 73 and momentarily moves it (in clockwise direction) against the force of its spring, causing the link rod 72 to rotate the member 70 (in clockwise direction) which in turn causes the link arm 75 to lift the latch member 76 out of contact with the pin 59. This permits the packer 19 to resume operation and to move alternately upwardly and downwardly as previously described. Meanwhile the trip plate 30 returns to normal raised position under the force of its spring 68 (FIG. 3) and the member 70, as soon as the arm 73 is disengaged from the arm 106 on the moving plunger, returns to the normal position shown in FIG. 3, moving into engagement with the bottom of the arm 66 of the trip plate 30, causing the latch member 76 to remain in inactive raised position. As soon as the latch member 76 is raised the link rod 77 will be pulled a short distance (to the right as viewed in FIG. 3) by its spring 81, which results in the upper portion of the bell crank lever 82 moving upwardly until the notch 82' is in position for engaging the pin 89.

When the plunger 26 reaches the end of its return stroke the member 105 engages the arm 103 of the slide 97 (FIG. 3). The resulting movement of the slide 97 (to the right) causes the finger 102 on the arm 101 of the slide 97 to engage the toggle lever 85 and move it a short distance clockwise. However, due to the fact that the notch 82' is now in position to be engaged by the pin 89, the opposite swing of the toggle levers 84, 85 under the pull of the toggle spring 88 is arrested before being completed, with the result that the valve 94, controlling the operation of the plunger 26, is held in neutral position until the notch 82' is again lowered out of engagement with the pin 89, whereupon the plunger again performs its cycle.

Referring briefly again to FIG. 1, the bale tying mechanism is indicated in general by the reference 106. However, since this bale tying mechanism is well known in the art and is commonly used on other baling machines, this portion of the baler need not be described. Its manner of operation is conventional and it does not form a part of the present invention.

A suitable rear housing 107 (FIG. 1) is provided on the baler and contains the hydraulic fluid reservoir and various hydraulic control valves which will now be described with reference to the diagram which constitutes FIG. 10 of the drawings.

The baler employs two hydraulic pumps, a main pump, indicated at 108 in FIG. 10, which furnishes the hydraulic power for operating the packer and the plunger, and a smaller hydraulic pump, indicated at 109 in FIG. 10, which operates the hydraulic assembly controlling the tensioning rails by which the completed bales are engaged. The hydraulic fluid reservoir is indicated at 110 in FIG. 10. The main pump 108 delivers hydraulic fluid through the line 111 and branch line 112 to the control valve 94, and, depending upon the position of the control valve 94, into either end of the cylinder 48 for the plunger 26, with the discharge of hydraulic fluid taking place from the opposite end of the cylinder through lines 113 and 113' except when the valve 94 is held in neutral position, in which case there is no delivery of hydraulic fluid to or from either end of cylinder 48.

Similarly hydraulic fluid is delivered through line 111 and branch line 116 to the control valve 96 for the packer, and, depending upon the position of the control valve 96, into one of the two lines 118 or 120 with the exhaust taking place through the other line and thence to lines 121 and 113'. However, when the packer is held in the down position (and thus when the valve 96 is held in the position shown in FIG. 10 through the action of the latch member 76 and connected members in the manner previously explained with reference to FIG. 3) during the time the plunger is compressing the material in the baling chamber, a relief valve 119 opens under the increased pressure in line 118 and enables the blocked hydraulic fluid in line 118 to discharge through the relief valve 119 and lines 120, 121 and 113'.

The smaller hydraulic pump 109 delivers hydraulic fluid through the regulator valve 130 and the line 123 to the cylinder 40, and, under normal conditions, causes the pressure in cylinder 40 to be maintained at the desired predetermined pressure for which the regulator valve 130 has been set.

However, in the event an excessive load is imposed upon the plunger 26 (thus when a bale has been formed of wet motes instead of dry motes and the regulator valve 130 has been set to provide pressure in the cylinder 40 suitable for a bale of dry motes), then the excessive pressure in the line 111, acting through the branch line 124, will cause relief valve 125 to open and allow back pressure to pass through line 126 so as to open the by-pass valve 127. The opening of the by-pass valve 127 reduces the pressure in line 123 (and thus in the cylinder 40) by causing some of the hydraulic fluid in line 123 to pass through line 128, by-pass valve 127 and lines 124 and 113'. This continues as long as the excess pressure in line 111 is sufficient to cause relief valve 125 to remain open.

Thus when an undesired excess load would be imposed on the plunger, the increase in the hydraulic pressure required to operate the plunger results in the by-pass valve 127 being opened and the pressure in cylinder 40, and the restraining tension exerted by the tensioning rails 33 and 34 on the previously formed bale, to be reduced to the point where no appreciable excess load is imposed on the plunger. This all takes place automatically enabling the baler, when set for handling material of a certain density, to adjust itself automatically temporarily whenever material of greater density is delivered into the baler.

I claim:

1. In a baler, a baling chamber, a packer for delivering material down into said chamber, means for operating said packer, a plunger for compressing material in said chamber, means for operating said plunger, a spring-controlled trip plate in the bottom of said chamber, and means actuated by said trip plate causing said packer operating means to cease operating and said plunger operating means to start operating when said trip plate is pushed down against the force of its spring by the material in said chamber.

2. The combination set forth in claim 1 with said packer mounted on a substantially horizontal axis and having a bottom wall extending in substantially vertical position when said packer is raised and extending in substantially horizontal position when said packer is lowered, said bottom wall of said packer constituting the top wall of said baling chamber when said packer is lowered, said trip plate causing said packer to be kept lowered when said trip plate is pushed down.

3. In a baler, a baling chamber, a packer for delivering material down into said chamber, means for operating said packer, a plunger for compressing material in said chamber, hydraulic means for operating said plunger, a discharging channel leading from said chamber, hydraulically operated tensioning means for restraining the movement of a bale through said discharging channel, said plunger acting to force material from said chamber into said channel against the resistance offered by a previously formed bale in said channel, a spring-controlled trip plate forming the bottom of said chamber, and means actuated by said trip plate causing said packer to cease operating and said plunger to start operating when said trip plate is pushed down against the force of its spring by the material in said chamber.

4. The combination set forth in claim 3 with the addition of cooperating control means connected with said hydraulically operated tensioning means and with said hydraulic means for operating said plunger, said cooperating means so arranged that excessive pressure in said hydraulic means operating said plunger will cause a pressure reduction in the hydraulic means operating said tensioning means, thereby reducing the resistance offered by a previously formed bale in said discharging channel when the pressure in the hydraulic means required for operating said plunger exceeds a desired predetermined amount.

References Cited

UNITED STATES PATENTS

| | | | |
|---|---|---|---|
| 949,767 | 2/1910 | House | 100—45 XR |
| 2,158,745 | 5/1939 | Dalimata | 100—45 |
| 2,168,889 | 8/1939 | Thomas. | |
| 2,294,440 | 9/1942 | Barker | 100—189 XR |
| 2,396,720 | 3/1946 | Nolt | 100—48 |
| 2,633,794 | 4/1953 | Rothrock | 100—43 XR |
| 2,646,745 | 7/1953 | Seltzer | 100—45 XR |
| 2,688,284 | 9/1954 | Paradise | 100—45 |
| 2,938,451 | 5/1960 | Seltzer | 100—45 XR |
| 3,024,719 | 3/1962 | Englund | 100—49 XR |
| 3,294,013 | 12/1966 | Seltzer | 100—49 XR |

BILLY J. WILHITE, Primary Examiner

U.S. Cl. X.R.

100—187, 189, 192